Patented Dec. 26, 1950

2,535,986

UNITED STATES PATENT OFFICE 2,535,986

PURIFICATION OF PHOSPHOR COMPONENTS

Elmer C. Payne, Marblehead, Mass., assignor to Sylvania Electric Products Inc., Salem, Mass., a corporation of Massachusetts No Drawing. Application May 15, 1948, Serial No. 27,369

3 Claims. (Cl. 23—107)

This invention relates to purification of chemicals, and particularly to purification of materials such as di-ammonium phosphate for use in fluorescent phosphors.

The so-called "C. P." or "chemically pure" grade of this material commercially available is not generally satisfactory for use in such phosphors, which must be especially free from iron salts and those of other "heavy" metals. We has used sulfide treatment for this purpose, which is undesirable because it leaves a soluble sulfide residue which is difficult to remove and which may leave behind sulfate and perhaps free sulfur and sulfide, any of which may prove undesirable.

Objects of my invention were therefore to achieve the desired purification with a reagent which was innocuous and not disagreeable, and whose surplus did not have to be removed from the material purified. These objects were attained by the use of tannic acid, which has the further advantage of being cheap and of serving as its own indicator for complete precipitation.

The tannic acid is particularly desirable as the purifying agent for the di-ammonium phosphate used with calcium chloride to form secondary calcium phosphate for use in the manufacture of fluorescent halo-phosphates, as shown, for example, in a copending application of Keith Butler, Serial No. 25,692 filed on May 7, 1948 for a Calcium Halophosphate Phosphor.

As an example of the manufacture of a calcium halo-phosphate phosphor according to that application, calcium carbonate, secondary calcium phosphate, manganous carbonate, antimony trioxide and calcium halide may be mixed, that is, dry-blended, in the form of powders of small particle size, hammermilled to form an intimate mixture, and then fired in 80 cc. covered porcelain crucibles for an hour at a temperature of 1130° C. The best time and temperature of firing will vary with the size of crucible and exact composition of the raw material blend.

The ingredients may be mixed in the approximate gram-atom proportions of calcium plus manganese, 4.9, phosphorus 3, halogen (chlorine, fluorine or both) 1.04, antimony 0.05 to 0.30, manganese, zero to 0.50. The phosphor without manganese will fluoresce blue, becoming whiter and then redder as more manganese is added. As indicated by the proportions, a small but definite excess of phosphate and fluoride over the stoichiometric proportions is necessary for maximum brightness and efficiency.

The secondary calcium phosphate used may be prepared by taking a water solution of C. P. ammonium phosphate having a concentration, for example, of 2.3 mols per liter, although this is not critical, and being sufficient to produce the proper excess of phosphate. The temperature of the ammonium phosphate may be 65° C., for example. This may be added to a C. P. calcium chloride solution with a concentration of 4.0 moles per liter to cause the precipitation. The precipitate is of course filtered, washed thoroughly with water until substantially free of ammonium chloride, and dried in a manner customary in the art.

In following my invention the solution of the crude ammonium phosphate from which the secondary calcium phosphate is to be precipitated may be made 2 to 2.5 molar. This solution may be vigorously stirred while a 10% aqueous solution of tannic acid is added until precipitation is complete. A test for this may be made by filtering a small portion and testing with a drop of tannic acid.

The iron tannate comes down as a purplish-red flocculent precipitate. Before sufficient tannic acid has been added, a purple colloidal solution of iron tannate is formed. Upon further addition, this coagulates. The suspension of iron tannate filters easily, but the addition of the usual filter aids common in the art may help to prevent passage of precipitate through the filter. The filtered solution is pale tan in color which changes to brown upon standing. Later a small amount of brown precipitate may settle out. The brown color may be bleached by oxidation with chlorine or bromine. However, this hardly seems necessary.

Tests of the resultant material shows that iron, copper, chromium and lead are practically completely removed by my process. Very small traces of nickel and cobalt, and a somewhat larger trace of zinc, may remain, but these metals do not seem to be present in the usual raw materials such as di-ammonium phosphate.

There is a small amount of organic matter left in the final material by my method, due to the necessity for an excess of tannic acid. This appears to be harmless, and does not seem to affect the brightness of the calcium halophosphate made from di-ammonium phosphate prepared by my method.

My purification method may be useful for other salts than di-ammonium phosphate, especially if they are alkaline or neutral in solution. My method is unsuitable for very acidic solutions.

What I claim is:

1. The method of treatment of di-ammonium phosphate containing heavy-metal impurities which includes the steps of adding tannic acid to a solution thereof to purify the same, filtering the resulting suspension, and employing the so-purified solution in the production of fluorescent halo-phosphates.

2. The method of treatment of an iron-containing di-ammonium phosphate which includes the steps of adding tannic acid to a solution thereof to produce iron tannate in suspension, filtering the iron tannate from the suspension, and employing the resultant solution in the production of fluorescent halo-phosphates.

3. The method of treatment of di-ammonium phosphate containing heavy metal impurities, which method comprises making a 2 to 2.5 molar aqueous solution of di-ammonium phosphate, vigorously stirring this solution while adding a 10% aqueous solution of tannic acid until precipitation is complete, then filtering the resulting suspension, and employing the so-purified solution in the production of fluorescent halo-phosphates.

ELMER C. PAYNE.

REFERENCES CITED

The following references are of record in the file of this patent:

UNITED STATES PATENTS

| Number | Name | Date |
|---|---|---|
| 2,044,940 | Haag et al. | June 23, 1936 |

OTHER REFERENCES

Prescott et al., Qualitative Chemical Analysis, 5th ed., D. Van Nostrand Co., New York (1901), pp. 153-4.